United States Patent [19]

Burch

[11] Patent Number: 4,799,001

[45] Date of Patent: Jan. 17, 1989

[54] START OF SCAN CIRCUIT FOR FTIR SPECTROMETER

[75] Inventor: Robert V. Burch, Madison, Wis.

[73] Assignee: Nicolet Corporation, Madison, Wis.

[21] Appl. No.: 76,916

[22] Filed: Jul. 23, 1987

[51] Int. Cl.[4] .............................................. G01B 9/02
[52] U.S. Cl. .................................... 318/640; 318/603; 356/346
[58] Field of Search ................ 318/640, 603; 356/346, 356/349, 351; 324/322

[56] References Cited

U.S. PATENT DOCUMENTS

| | | | |
|---|---|---|---|
| 3,995,207 | 11/1976 | Way | 318/640 |
| 4,014,614 | 3/1977 | Sandercock | 356/346 |
| 4,132,940 | 1/1979 | Schindler | 318/640 |
| 4,413,908 | 11/1983 | Abrams et al. | 356/346 |

FOREIGN PATENT DOCUMENTS

| | | | |
|---|---|---|---|
| 0065122 | 4/1986 | Japan | 356/346 |
| 0524074 | 11/1976 | U.S.S.R. | 356/346 |
| 0789688 | 12/1980 | U.S.S.R. | 356/346 |

OTHER PUBLICATIONS

Hanel, R. A. et al., "The Nimbus III Michelson Interferometer", Applied Optics, vol. 9, No. 8, Aug. 1970, pp. 1767-1774.

Primary Examiner—Bentsu Ro
Attorney, Agent, or Firm—Lathrop & Clark

[57] ABSTRACT

A start of scan circuit for an FTIR spectrometer includes a mode counter, counting through various states of operation of the moving mirror in the FTIR interferometer, and a positioning counter circuit which counts laser pulses from a positioning laser also directed through the interferometer. By appropriately loading and counting up or down the counter in various states, as determined by the mode counter, the circuit can flexibly control the start of scan of the FTIR so that that start of scan can be selectively varied by switches and/or under software control.

12 Claims, 2 Drawing Sheets

START OF SCAN CIRCUIT FOR FTIR SPECTROMETER

FIELD OF THE INVENTION

The present invention relates, in general, to the field of Fourier-transform infrared (FTIR) spectrometers and relates, in particular, to circuitry for controlling the start of scan and data taking time of a moving mirror of an FTIR optical system.

BACKGROUND OF THE INVENTION

The field of infrared spectroscopy has developed to provide devices for the prompt and efficient identification of chemical substances. Many of the Fourier-transform infrared (FTIR) spectrometers systems in commercial and laboratory use today make use of a Michelson interferometer to create a time varying light wave to pass through a sample of material. Variations in the light intensity due to interference in the sample chamber are created by a moving mirror in the interferometer. Motion of the interferometer moving mirror is normally tracked by a positioning laser operating in parallel with the light source of the spectrometer, with the laser also entering the interferometer. The laser has a wavelength shorter than the light source so that the light intensity changes due to interference in the output from the interferometer gives precise positioning information as to the change in position of the moving mirror.

The operation of such a Michelson interferometer FTIR spectrometer system is thus critically dependent on the changing position, speed, and control of the moving mirror. Since the motion of the mirror is desired to be constant, and since the mirror must stop and change direction, it is normal to have a series of position detectors to detect the position of the mirror during its accelerating and constant velocity phases, so that precise information as to the location of the mirror can be utilized by the control circuitry of the FTIR. Such information is necessary to determine when to sample and digitize data. Usually the position sensors for identifying the exact location of the mirror include several sets of photodetectors and appropriate interrupting tabs, located on the moving carriage of the mirror, arranged along the track of motion of the mirror. Thus, for example, one photodetector would typically be located at the extreme position of the withdrawal of the mirror, and a second photodetector would be necessary to indicate when the start of scan position of the mirror had been reached.

One disadvantage of such a system is that the positioning of the mirror is then fixed by the hardware of the spectrometer. In other words, if a single start of scan photodetector is hard-wired into the system, the scanning always begins at that location. While this is suitable for many applications, in some particularized applications it is desired to advance or retard the position of the start of scan, or to delay the period in which data is taken for some particular purposes. By operating the moving mirror start of scan position under software control, with an adjustable position control for the taking of data, such an objective can be realized.

SUMMARY OF THE INVENTION

The present invention is summarized in that a start of scan circuit for an FTIR spectrometer is based on the operation of a single photodetector responsive to the position of the moving mirror of the Michelson interferometer, with the start of scan circuit reversing the direction of mirror motion and implementing a position delay for the reception of data, all under software control.

It is an object of the present invention to provide a start of scan and moving mirror control in an FTIR spectrometer which can be preadjusted by appropriate software, so as to variably control the start of scan depending upon the application in which the FTIR is to be utilized.

It is another object of the present invention to provide a mode control circuit which can be utilized to indicate the mode of the mirror operation to other control circuitry of the FTIR system.

It is yet another object of the present invention to minimize the number of position detectors which must be associated with the moving mirror in an FTIR system so as to minimize the assembly cost and expense associated with the moving mirror and interferometer construction.

Other objects, advantages, and features of the present invention will become apparent from the following specification when taken in conjunction with the accompanying drawings.

DETAILED DESCRIPTION OF THE PREFERRED EMBODIMENT

Figure 1:
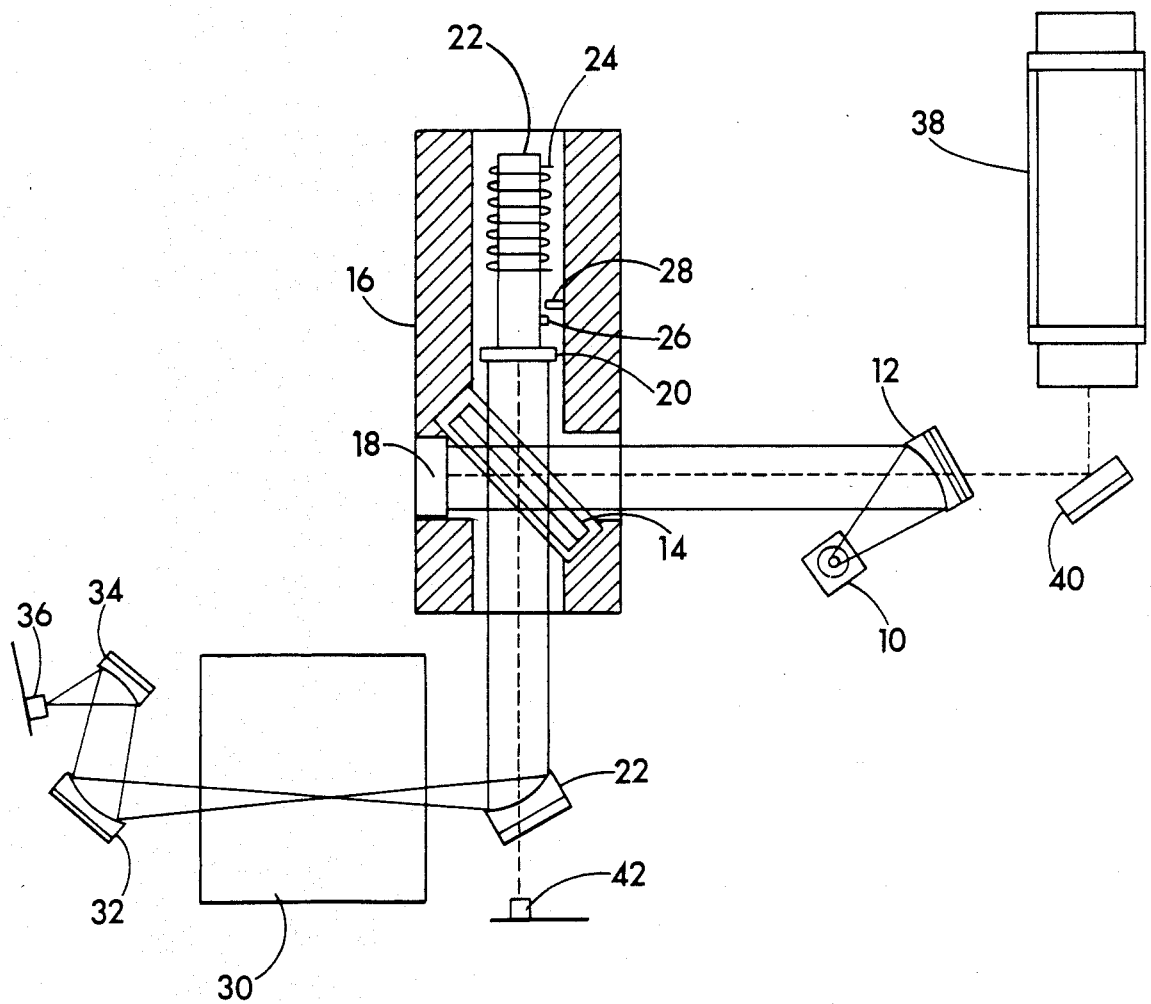
FIG. 1 is a schematic view of the optical path of an FTIR spectrometer constructed in accordance with the present invention and including a Michelson interferometer.

In FIG. 1 as illustrated, the optical layout of a typical FTIR spectrometer system utilizing a Michelson interferometer. The system is illustrated in schematic form. It is to be understood that such interferometer systems can be laid out in many geometries and that the schematic illustration of FIG. 1 is intended to be exemplary of one of many such geometries which are possible.

An infrared light source is indicated at 10. The light emanating from the light source 10 is reflected off of a collimating mirror 12 which directs the light in a beam toward a beam splitter 14, located in an interferometer housing 16. The light from the mirror 12 which passes through the beam splitter 14 is then reflected by a reflecting mirror 18 located in the optical path of the beam coming from the mirror 12. Perpendicular to the light path between the mirrors 12 and 18 is a light path created by recombining light from the first beam with light partially reflected by the beam splitter 14. This path extends between a moving mirror 20 and a focusing mirror 22. The moving mirror 20 moves toward and away from the beam splitter 14, or vertically as viewed in the schematic view of FIG. 1. This motion is accomplished by mounting the moving mirror 20 on a shaft 22 which is reciprocated on a linear axis forwardly and rearwardly by a voice coil 24. Mounted on the shaft 22 is a projection or tab 26 which is arranged so as to pass through a light beam extending between a light source and a photodetector 28 as the shaft 22 moves linearly in the housing 16 so as to interrupt the light flow to the photodetector 28 when the tab 26 is adjacent thereto.

Light leaving the interferometer housing 16 is reflected by the focusing mirror 22 through a sample chamber 30 from where it goes to focusing mirrors 32 and 34 in which it is focused on a detector 36. Motion of the moving mirror 20 thus makes a time dependent light signal in the sample chamber 30, the variations in which may be detected by the detector 36. This information can be analyzed by appropriate Fourier analysis to indicate the spectral characteristics of the substance contained in the sample chamber 30.

In order for appropriate and accurate frequency domain information to be generated by the FTIR spectrometer system, the direction of motion, the speed of motion, and the position of the moving mirror 20 must be controlled at all times. For this purpose, a laser interferometer system is used to precisely indicate motion and position of the moving mirror 20. This system consists of a laser 38, the output of which is directed off of a reflecting mirror 40 into the center of the light path of the interferometer housing 16. The laser beam, indicated in dashed lines in FIG. 1, is also split by the beam splitter 14 creating a sinusoidal interferometry pattern directed toward the mirror 22. The mirrors 12 and 22 are both constructed so that the laser light passes therethrough. The laser interferometer output is detected by a detector 42 located behind the mirror 22. Thus, as the moving mirror 20 moves, the interferometer pattern of the split beam laser light will come into and out of phase, thus creating a variable intensity of light beam, varying in a sine function, detected at the detector 42, with each cycle representing a fixed increment of linear distance of movement of the moving mirror. This sinusoidal light wave received at the detector 42 is digitized by a zero-crossing detection circuit (not shown) which generates a pulsed output, as discussed below.

Figure 2:
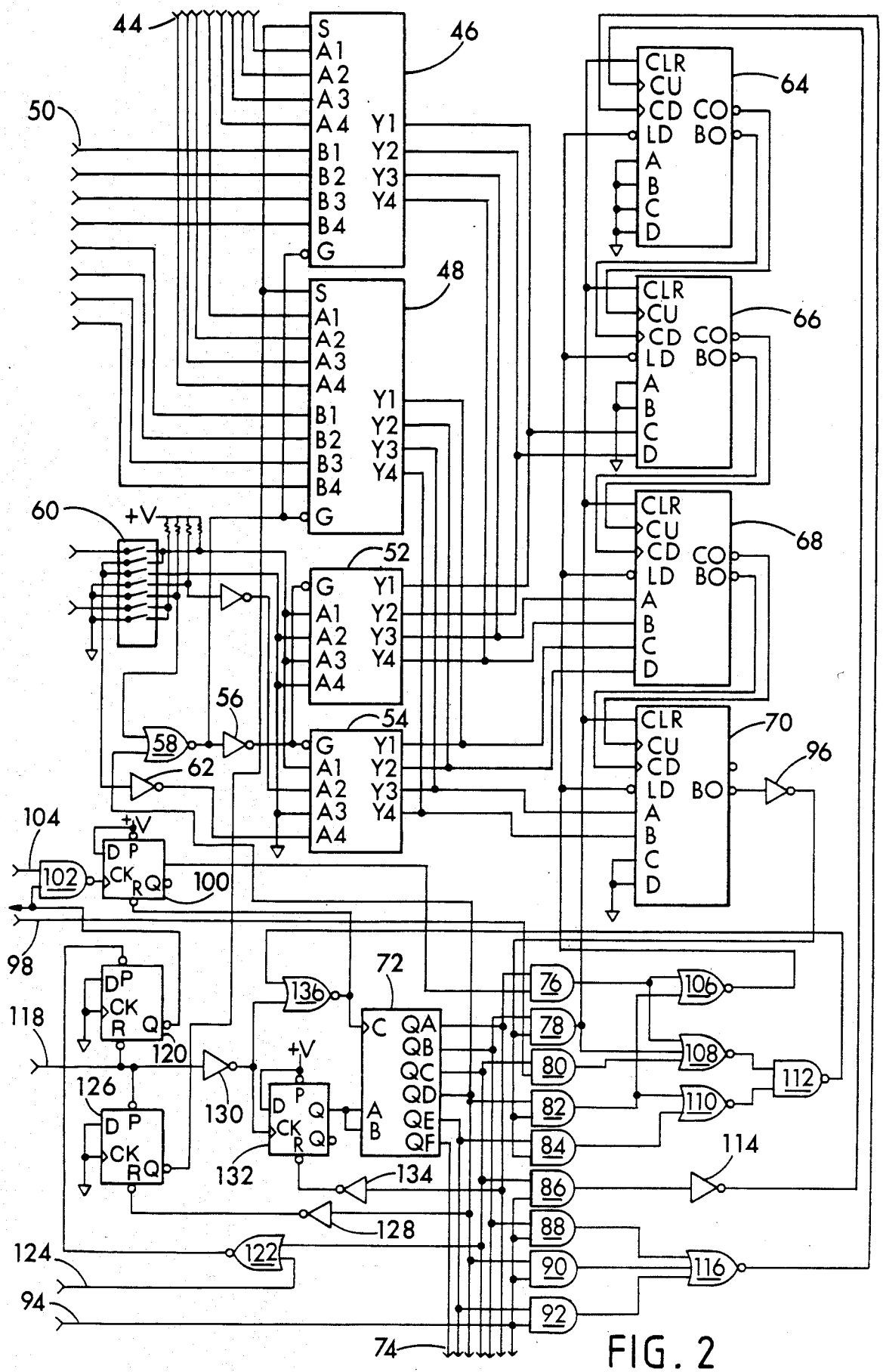
FIG. 2 is a schematic illustration of a digital electronic start of scan circuit constructed in accordance with the present invention for operation and control of the moving mirror of FIG. 1.

Illustrated in FIG. 2 is the digital circuitry for a start of scan circuit for an FTIR system constructed in accordance with the present invention. It is envisioned that the overall control of the moving mirror, and of the FTIR system as a whole, is directed by a mini-microcomputer operating under software control. The computer (not shown) is located in another part of the control circuitry for the FTIR system. Connected either to the microprocessor, or to specific address locations dictated by it, is an eight line bus 44 which enters the circuit of FIG. 2, and which is intended to carry a software loaded distance count as will be described further below. Four lines of the bus 44 are connected to a first four-bit multiplexer 46 and the other four lines are connected to a second four-bit multiplexer 48. Each of the multiplexers 46 and 48 is a four-bit multiplexer which selects between one of two sets of four-bit input lines to present at its four output locations. The other four inputs of each of the multiplexers 46 and 48 are connected to an eight line bus 50 which serves, as described in greater detail below, to introduce the data delay distance count, also loaded under software control, into the circuit of the present invention.

Arranged in parallel with the multiplexers 46 and 48 are two four-bit buffer drivers 52 and 54. The eight output lines of the buffer drivers 52 and 54 are connected to the respective output lines of the two multiplexers 46 and 48 so that their outputs are combined to make a single output 8-bit bus. The gating or enable inputs to the buffer drivers 52 and 54 are connected to the output of an inverter 56, the input to which is the output of a NAND gate 58. The output of the NAND gate 58 is also connected to the gating or enable inputs to the multiplexers 46 and 48. One input to the NAND gate 58 is connected by a resistor to positive voltage and also connected to one switch of a DIP switch pack 60. Other outputs of the DIP switch pack 60 are connected to the inputs to the bus drivers 52 and 54, either directly or through an inversion, such as the inverter 62 provides to the fourth bit connected to the buffer driver 54. The remaining connections to the DIP switch pack 60 are variously connected to the supply voltage or to ground so that the various combinations of operation of the switches in the DIP switch pack 60 will produce a selectable set of bits to the inputs to the bus drivers 52 and 54.

The circuit of FIG. 2 is provided with a series of cascaded counters 64, 66, 68 and 70. The counter 66 has its carry and borrow outputs connected to the count-up and count-down inputs of the counter 66. The counter 66 has its carry and borrow outputs connected to the count-up and count-down inputs of the counter 68. Similarly the carry and borrow outputs of the counter 68 are connected to the count-up and count-down inputs to the counter 70. Each of the counters 64 through 70 is a four-bit counter. The counters connected in series in this fashion thus make a cascaded 16-bit counter. The preload inputs to the counter 64 are grounded, as are the first two bit inputs to the counter 66. The bus of eight output lines connected to the multiplexers 46 and 48 and the buffer drivers 52 and 54 are connected to the two most significant bits of the preload inputs to the counter 66, all four preload input bits to the counter 68 and the two least significant preload input bits to the counter 70. The two most significant preload input bits to the counter 70 are also grounded.

Also provided in the circuit of FIG. 2 is a shift register 72, which functions in the circuit of FIG. 2 as a state machine or counter, the output of which is a single high signal applied on one of its eight output lines. All of the first six output lines from the counter 72 exit the circuit of FIG. 2, through a 6-bit bus 74, which serves as an indication of the state of the circuit of FIG. 2, and the state of motion of the moving mirror 20, to the rest of the control electronics of the FTIR system. Each of the first five bit outputs of the counter 72 is connected to one input of a respective one of five two-input AND gates 76, 78, 80, 82, and 84. Another two input AND gate 86 is provided with one of its inputs connected to the third output bit of the counter 72. Another two input AND gate 88 has one of its inputs connected to the second output bit of the counter 72. Yet another two input AND gate 90 has one of its inputs connected to the fourth output bit of the counter 72. A last two input AND gate 92 has one of its inputs connected to the fifth output bit of the counter 72. The other input to each of the AND gates 86, 88, 90, and 92 is connected to an input line 94. The input line 94 is a gated output from the zero crossing detection circuit receiving the output of the laser detector 42, shown on FIG. 1, so as to create a pulse, going high, upon each detection of the laser detector 42 of an interference cycle of laser light emanating from the interferometer of FIG. 1. The input line 94 thus carries a series of pulses directly corresponding to cycles of laser light at the detector 42. The other input to each of the gates 78, 82, and 84 is connected to the output of an inverter 96, the input to which is connected to the borrow output of the counter 70. The other input to the gate 80 consists of an input line 98 which is the output of a one-shot or timer, not shown in the circuitry of FIG. 2, which is continually retriggered by the pulses from the laser detector 42, such that the line is maintained in a low state until no pulses are detected by the laser detector 42, at which time the one-shot times out, and the line is forced into a high state indicating that the pulses to the laser detector 42 have ceased. The other input to the gate 76 is connected to the positive output of a flip-flop 100 which has its input tied high and has its clock input tied to the output of a NAND gate 102. One input to the NAND gate 102 consists of an input line 104, which is connected to a gated output from the photodetector 28, of the circuitry of FIG. 1, so that it goes high when the moving mirror passes the photodetector indicating a start of scan operation.

The output of the AND gate 76 is connected to one input of two NOR gates 106 and 108. The NOR gate 106, which is a two input gate, has its other input connected to the output of the AND gate 82, which is also connected to one input of a two input NOR gate 110. The output of the NOR gate 106 is tied to the load inputs to the counters 64, 66, 68 and 70. The output of the AND gate 78 is connected to one input of the NOR gate 108 and is also connected to the clear input to each of the counters 64, 66, 68, and 70. The output of the AND gate 80 is connected to the last of the three inputs to the NOR gate 108. The output of the AND gate 84 is connected to the other input of the two input NOR gate 110. The outputs of the NOR gates 108 and 110 are connected to the two inputs of a NAND gate 112. The output of the AND gate 86 is connected through an inverter 114 to the count-up input to the counter 64. The output of the AND gates 88, 90, and 94 are all connected to the inputs of a NOR gate 116, the output of which is connected to the count down input to the counter 64. Also entering the circuit of FIG. 2 is an input line 118, which is operated by the microprocessor controlling the operation of the FTIR circuit. The line 118 is intended to go low when the data taking portion of an FTIR scan is completed or when the physical end of a scan is detected. This line thus indicates the end of a scan operation. The input line 118 is connected to the reset input of a flip-flop 120. The set input to the flip-flop 120 is connected to the output of a NOR gate 122. One input to the NOR gate 122 is connected to the third output bit of the counter 72, and the other input to the NOR gate is connected to an input line 124 which is a failsafe start/stop input to the circuitry of FIG. 2. The negative output of the flip-flop 120, which thus functions as a latch, is connected to one input to the NAND gate 102 and is also connected away from the circuit of FIG. 2 as an output thereof. The input line 118 is also connected to the set input of a flip-flop 126. The reset to the flip-flop 126 is connected to the output of an inverter 128, the input of which is connected to the fourth output line of the counter 72. The flip-flop 126, which also functions as a latch, has its negative output connected to the select inputs to the multiplexers 46 and 48. The input line 118 is also connected to the input of an inverter 130, the output of which is connected to the clock input of a flip-flop 132 whose data input line is tied high. The output of the flip-flop 132 is connected first to input bits (which are gated together internally) to the counter 72. The reset input to the flip-flop 132 is connected to the output of an inverter 134, the input to which is the first output bit of the counter 72. The output of the inverter 130 is also connected to one input of a NOR gate 136, the other input to which is connected to the output of the NAND gate 112. The output of the NOR gate 136 is connected to the clock input of the counter 72 and is also connected to the reset input to the flip-flop 100.

In its operation, the circuit of FIG. 2 is intended to be responsive to, and help control the position of, the moving mirror 20 of FIG. 1. In general concept, the moving mirror 20 proceeds rearwardly, or up in the schematic view of FIG. 1, during a scanning operation in which data is taken in the FTIR system of FIG. 1. After the data is taken, the microprocessor control reverses current flow through the voice coil 24 and causes the mirror to move forwardly. It is when the tab 26 on the shaft 22 of the moving mirror 20 interrupts the photodetector 28 that the circuit of FIG. 2 begins its operation.

When the microprocessor completed its scanning operation, it resets the circuit of FIG. 2 by driving the end of scan indicating input line 118 low. This signal resets the flip-flop 120, sets the flip-flop 126, and, through the inverter 130, clocks the flip-flop 132 into a positive state. The low signal on the input line 118 also drives the clock input to the counter 72 low. After the reset pulse on input line has been applied, the input line 118 returns high. This clocks the output of flip-flop 132 (a high signal) into the counter/shift register 72, giving a high output on its first output bit. This high output is applied through the inverter 134 to reset the flip-flop 132 for the next operation. This state of the system, with a high on the first output bit of the counter 72 is the first, or Mode O, state of the circuit.

The inverted output of flip-flop 120 is connected to the input of a NAND gate 102 whose other input 104 is connected to output of the photodetector 28. With both those inputs high indicating that the tab has not yet reached the photo switch, the output of the NAND gate 102 is low. When the tab 26 on the moving mirror interrupts the photodetector, the line 104 goes low and the output of the NAND gate 102 goes high thereby clocking the flip-flop 100 into its set state. The output of the flip-flop 100 combined with the first output bit of the counter 72 by the AND gate 76, the output of which then goes high. That high output cascades through gates 108, 112, and 136 to reset the flip-flop 100.

The counter 72 serves as a state counter, determining the states in which the circuit of FIG. 2 is operating. Each state of the state counter 72 corresponds to a physical state of the moving mirror 20. The first state, or mode zero, is the state in which a specific software count is loaded into the counters 64 to 78 to provide for a pre-selected count causing a delay during which the mirror is allowed to continue its forward motion. This state or mode is thus initiated when the mirror 20, in its rearward motion interrupts the photodetector 28. During this state, represented by a true signal on the first output bit of the counter 72, the output of the AND gate 76 is connected through the NOR gate 106 to the load inputs to the counters 64 through 70. At the same time as this has been occurring, the input to the preload input lines to the counters 66 through 70 must be properly selected. The selection input to the multiplexers 46 and 48 is controlled by the output of the flip-flop 126 which has been preset by the signal 118. When the flip-flop 126 is set, its output selects the data in the bus 44 to be selected through the multiplexers 46 and 48 to be presented to the counters 66, 68 and 70. During this mode, or prior to it, the computer has presented a numerical input valve on the data bus 44. This input is a number representing the number of laser pulses, corresponding to a fixed distance, that the mirror 20 is to go past, under power, beyond the photodetector 28. This position, to which the mirror will return in a later mode, is the earliest possible start of scan when the mirror proceeds forwardly. If the proper switch is thrown in the dip switch pack 60, at this stage the input to the counters 66 through 70 is from the bus drivers 52 and 54 rather than the multiplexers 46 and 48. This option is intended to mimic the function of a fixed photodetector system to determine the start of scan. With this option the dip switches 60 are thrown so that the numerical value loaded into the counters corresponds to the distance to the omitted (used in prior modes) start Of scan photodetector.

In summary, during the first mode of operation of the circuit, mode zero, the circuit is reset, the mode counter sits with its first bit high, and this enables the counters 66 through 70 to be preloaded with the selected count under software control selected by the microprocessor of the FTIR circuitry. The load of the count is enabled as the photodetector is interrupted which causes the flip-flop 100, to go high which cascades through the gates 76 and 106 to cause the count to be loaded into the counters 66 through 70. At the same time the output of the gate 76 drives the output of the NOR gate 108 low which drives the output of the NAND gate 112 high which drives the output of the NOR gate 106 low. This low resets the flip-flop 100 which cascades back through the gates 76, 108, 112, and 136 to drive that line back high which thereby clocks the state counter 72 into its next state, mode 1, thus ending mode O.

During mode 1, the circuit will count down the number loaded in the counters 64 through 70 as the mirror goes past beyond the photoswitch. During mode 1, the second output line of the state counter 72 is high. This line, is connected to the inputs of the gates 78 and 88. The purpose of the connection through the gate 88 is to gate through gate 88 the pulses from the laser detector 42, which are an input on line 94. The output of gate 88 cascades through gate 116 to the count-down input to the counter 64. Thus the counter 64 is counted down and the downward count cascades through the counter 66, 68, and 70. Thus the circuit remains in this state, and counting, until the count has counted down completely the input number which was preloaded into the counters 66 through 70. In physical terms, mode 1 continues until the mirror 20 has retreated exactly the preselected distance. When the loaded number has been counted down, so that the state of all the counters is at zero, the counter 70 places a borrow signal on its output which is transmitted through the inverter 96 to the input, to the AND gate 78. When the counter 70 indicates this borrow, both inputs to the AND gate 76 are high, thereby driving its output high. This not only immediately clears all the counters 64 through 70, it drives the output of the NOR gate 108 low which drives the output of the NAND gate 112 high which drives the output of the NOR gate 136 low. The clearing of the counters 64 through 70 removes the borrow output from the counter 70 which promptly causes the output of the AND gate 78 to go low thereby cascading through the gates 108, 112, and 136 to clock the clock 72 once to change the state of the state counter 72 to mode 2, or a high on its third output bit.

During mode 2, the servo control signal is reversed to the voice coil 24, and the mirror begins to come to a stop. The actual power control to the voice coil is controlled by servo circuitry not contained in the circuit illustrated in FIG. 2. The function of the circuitry of FIG. 2 is to accurately determine and control the position of the mirror, relative to the photodetector 28, and the start of scan, not to power the motion of the mirror. During mode 2, the third output of the state counter 72 is high, and the function of the circuit of FIG. 2 is to count laser pulses during the time required for the mirror to come to a stop to determine how far the mirror overshoots. Therefore, during mode 2, the third output line of the state counter 72 is connected to the input to the AND gate 86 which gates laser pulses, received on input line 94, therethrough. The output pulses from the AND gate 86 are connected through the inverter 118 to the count-up input line to the counter 64. The counters 64 through 70, which had just been cleared, now proceed to count up the pulses from the laser detector 42 which are received during the coast time. Physically, this number represents the distance that the mirror has overshot. Incidentally, the mode 2 signal also causes gate 122 to set the flip-flop 120. Input line 98 consists of the output of a one-shot, not illustrated in the circuit board illustrated in FIG. 2, which is triggered by the end of the pulses from the laser detector 42. The output of the one-shot pulses when the laser pulses cease, which they do when motion of the mirror also ceases. Therefore, the input line 98 remains low until the mirror comes to a stop, then pulses high. Thus, while the mirror is coasting, the counters are counting up, and when the mirror ceases to move, the input line 98 is pulsed high driving the output of AND gate 80 to pulse high. This pulse drives the output of NOR gate 108 low which drives the output of NAND gate 112 high which drives the output of NOR gate 136 low. When the pulse is cleared out by feedback indicating that the mirror has stopped, the counter 72 is also clocked to move the high bit to its fourth output line indicating the commencement of mode 3. Once the state counter 72 is clocked to its fourth state, or mode 3, the mirror begins retarding. The servo circuitry, which actually powers forward motion of the mirror, takes its direction from the output mode bus 74 from the counter 72. Thus a high on the third line indicates that the serve control is to stop forward movement of the mirror, and a high on the fourth bit output line causes rearward drive of the mirror.

At this point, it is desired to return the mirror to the point at which driving of the mirror forwardly ceased. In other words, the purpose is to return the mirror exactly to the point at which it began to stop. At the beginning of this mode, the counters 64 through 70 contain a numerical count exactly equal to the number of pulses received during the stop period corresponding to the stop distance. The high output of the fourth bit of the counter 72 is connected to the input to a gate 90 to gate through the pulses from the laser detector, inputted on line 94, to the gate 116 to the count-down inputs to the counters 64 through 70. Thus in mode 3, the counters will proceed to count down the count which they counted up when the mirror was stopping. This returns the mirror to the start-of-scan position marked at the end of mode 1. Once the count has been completely counted down, the counter 70 forces a borrow output which is transmitted through the inverter 96 to the input of the gate 82, which thereby drives its output high. The high output of the AND gate 82 causes the output of the NOR gate 110 to go low which causes the output of the NAND gate 112 to go high causing the output of the NOR gate 136 to go low. When the borrow pulse ends, the pulse cascades through the gates 82, 110, 112 and 136 to clock the counter 72 into the next state, mode 4, with an output on its fifth bit output line. During mode 3, the output of the AND gate 82 causes the output of the NOR gate 106 to go low thereby loading the counters 64 through 70 with a numerical value intended to implement a count down value representing a delay before taking data during the scan. The numerical value which is loaded into the counters 66 and 70 is the value presented on the take data delay input bus 50. The value on the take data delay bus 50 may be determined by a software loaded value or may be selected by an appropriate eight-bit switch bank connected to the bus. The number which is loaded into the counters 66 through 70 is the numerical value of the number of laser pulses which are to be counted before data may be taken. Physically, this represents an advance of the mirror 20 before data is taken. At the same time as that value is inputted into the circuit, the borrow output of the counter 70 disappears. The outputs of the gates 82, 110, and 112 therefore reverse polarity and the state counter 72 is clocked into its next position.

The next position of the state counter 72, or mode 4, is the counting phase during which the start of scan delay is counted down. The laser pulses received on input line 94 are gated through gate 92 and thereby through gate 116 to the count down input to counter 64. The counter 64, cascading through the counters 66 through 70, then proceeds to count down the loaded take data delay count until a borrow output pulse appears at counter 70. The borrow output is then transmitted by the inverter 96 to the gate 84 whose output thereby cascades through the gates 110, 112, and 136 to clock the state counter 172 into its next state. The state counter 74 is then in its next state, or mode 5.

Mode 5 is the take data mode. The start of scan circuit of FIG. 2 has no active function during this period, but the output on the sixth output of the counter 72 is used to enable the taking of data. When the collection of data is complete, the signal on line 118 clocks the counter 72 out of that state.

In the analysis of the circuitry of FIG. 2, it needs to be remembered at all time that the laser pulses correspond exactly to increments of linear position of the mirror 20. Therefore the initial load during mode zero of a numerical value into the counters 66 through 70 provides a corresponding value of linear distance that the mirror is to continue past the photodetector 28. Then, the count during mode 2 consists of a measurement of the actual distance that the mirror coasts after power has been cut from the voice coil 24. During mode 3 the circuitry merely recounts, or measures back the distance that the mirror goes forward retracing its steps during the coast. The take data delay implemented during mode 4 is intended to control when the actual scan of the FTIR components of FIG. 1 begins. Notice that this value is not dependent upon the detection of the mirror by the photodetector 28. Thus the scan can begin before, after, or even exactly at the photodetector, depending on the particular application in which the FTIR circuit is to be utilized. Thus the implementation of the start of scan circuit of FIG. 2 allows for maximum variability and fine control of the actual positioning of the start of scan regardless of the location of the photodetector 28. This allows for either short or long scans to be undertaken with the same apparatus with merely the positioning being altered under software control or by throwing appropriate switches. Thus maximum flexibility and operation of the FTIR circuit and its scans is achieved efficiently with a minimum of mechanical components and circuitry.

It is to be understood that the present invention is not limited to the particular embodiment disclosed here, but embraces all such modified forms thereof as come within the scope of the following claims.

I claim:

1. A start of scan circuit for an FTIR spectrometer which includes an interferometer with a moving mirror, a positioning laser also directed into the interferometer, and a laser detector for detecting in-phase pulses of laser light exiting from the interferometer and generating a digital output signal, the start of scan circuit connected through a servo circuit to control motion of the moving mirror, the start of scan circuit comprising:

a mode counter having a series of output lines which are clocked through a series of states, each state corresponding to a state of motion of the moving mirror, the mode counter output lines connected to the servo circuit to control the moving mirror motion;

a position counter circuit controllable selectively (i) to load a preselected numerical value into a position counter and (ii) to increment or decrement the numerical value therein;

physical position sensor means for detecting a position of the mirror; and gating means for connecting the output lines of the mode counter selectively (i) to gate the digital output signal of the laser detector to the position counter to increment or decrement the numerical value therein and (ii) to actuate the position counter to load said preselected numerical value, the gating means also for connecting the output of the position counter to the input of the mode counter, the gating means is also connected so that the position counter sequentially: (1) is loaded with a value when the physical position sensor means detects the position, the value representing a distance the mirror is moved beyond the physical position sensor means; (2) counts until the mirror moves the distance; (3) counts a distance the mirror retreats as it is stopped; (4) counts back the distance the mirror retreated as it stopped; (5) is loaded with a value representing a distance until the start of scan; and (6) counts until the distance is reached.

2. A start of scan circuit as claimed in claim 1 wherein the physical position sensor means is a photodetector responsive to the position of the moving mirror and wherein the output of the photodetector is also connected to the input of the mode counter so that at least one position of the moving mirror is used to change the state of the mode counter.

3. A start of scan circuit as claimed in claim 1 further including an input signal from the servo circuit indicating cessation of movement of the moving mirror, the input signal also being gated to the input of the mode counter to change the state of the mode counter when physical movement of the moving mirror ceases.

4. A start of scan circuit as claimed in claim 1 further including a multiplexer circuit to select between at least two numerical value inputs to present to the position counter, depending on the state of the mode counter, so that the numerical value loaded into the position counter can be different for different states of the mode counter.

5. A start of scan circuit as claimed in claim 1 wherein the mode counter is a shift register which is connected so that a single high signal on a single one of its output lines corresponds to each state of its operation.

6. A start of scan circuit as claimed in claim 1 wherein the position counter circuit comprises a plurality of up/down counters arranged in a cascaded circuit so as to function as a single multiple bit counter.

7. A Fourier-transform infrared spectrometer comprising:
   a Michelson interferometer having a moving mirror;
   a fixed position sensor responsive to a single position of the moving mirror;
   a positioning laser directed into the interferometer;
   a laser detector to detect in-phase laser light pulses exiting from the interferometer to thus indicate motion of the moving mirror;
   a servo circuit controlling the motion of the moving mirror;
   a position counter circuit selectively gated to count pulses from the laser detector to be thus counted up and down as the mirror moves;
   a mode counter means having a series of output lines connected to the servo circuit for controlling the mirror movement the mode counter means connected to the position counter circuit to control the gating of the laser pulses thereto depending on its state and also connected to the output of the fixed position sensor, the mode counter means operating sequentially in the following modes: (1) a mode one, initiated by detection of the position of the moving mirror by the fixed position sensor as the mirror retreats, in which the position counter circuit is pulsed by output of the laser detector to count down a value loaded in the position counter circuit while the mirror retreats under power; (2) a mode two, initiated by the end of the count of mode one, in which the power to the moving mirror is removed by the servo circuit, and during which the position counter circuit counts up pulses from the laser detector; (3) a mode three, initiated by the physical stopping of the moving mirror, in which the mirror is driven forward and during which the value in the position counter circuit is counted down by pulses from the laser detector; (4) a mode four, initiated by the end of the count of mode three, during which a numerical value is loaded in the position counter circuit and counted down by pulses from the laser detector to provide a selectable delay before spectrometry data is taken, and (5) a mode five, initiated by the end of the count of mode four, during which the spectrometry data is taken.

8. A spectrometer as claimed in claim 7 wherein the mode counter means also operates in a mode zero during which the numerical value to be counted down in mode one is loaded into the position counter circuit.

9. A spectrometer as claimed in claim 7 wherein the fixed position sensor is a photodetector.

10. A spectrometer as claimed in claim 7 wherein the mode counter means is a shift register connected to clock a single bit sequentially through its output lines so that a high bit on a single one of its output lines corresponds to each of its modes.

11. A spectrometer as claimed in claim 7 wherein the position counter circuit comprises a plurality of up/down counters connected in a cascaded circuit so as to function as a single multiple bit counter.

12. A spectrometer as claimed in claim 7 further including a multiple circuit responsive to the mode of the mode counter means among numerical values to present to the position counter circuit.

* * * * *